April 10, 1945.  R. L. STEVEN  2,373,611
HEATED FOOD CONTAINER
Filed Aug. 4, 1942
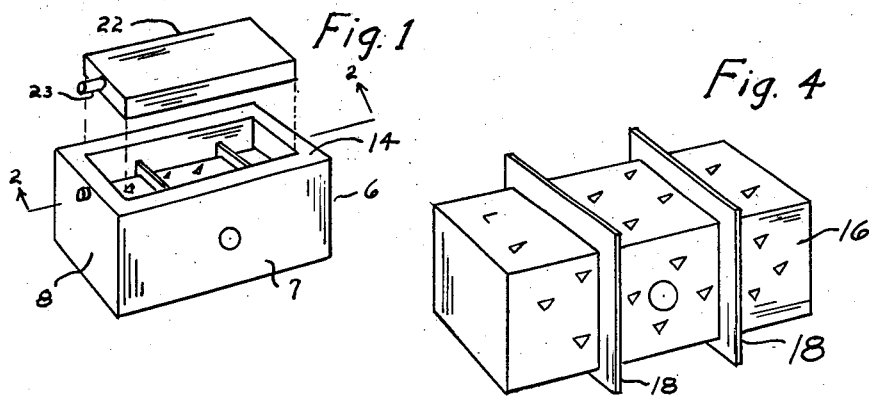
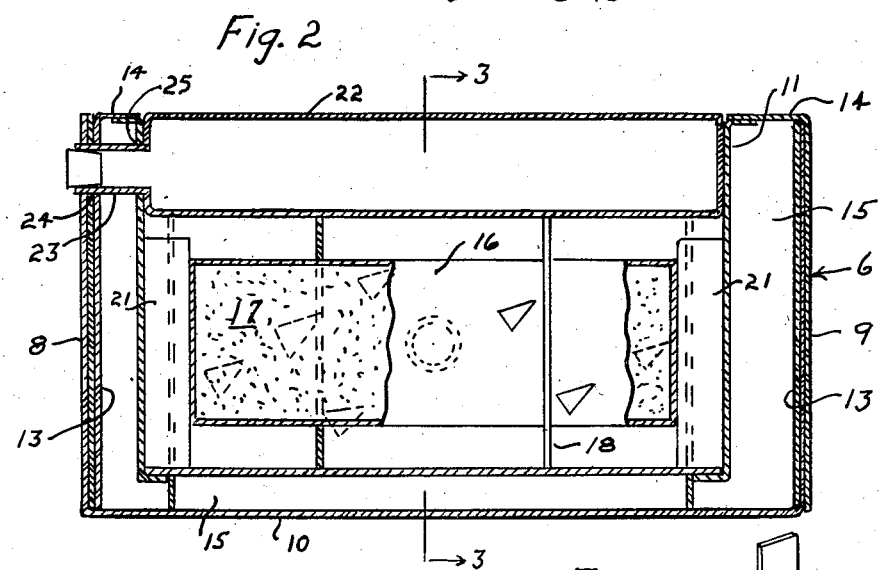
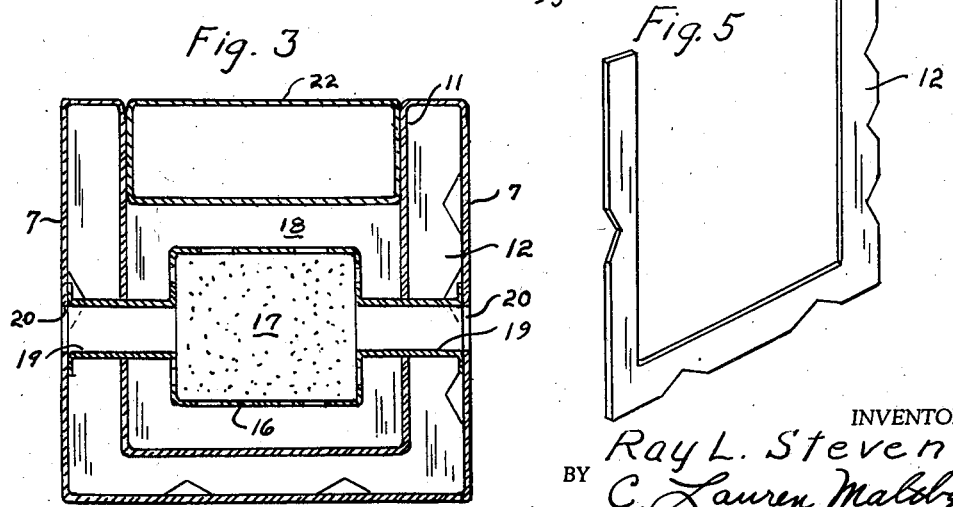
INVENTOR.
Ray L. Steven
BY C. Lauren Maloby
ATTORNEY Patented Apr. 10, 1945

2,373,611

UNITED STATES PATENT OFFICE 2,373,611

HEATED FOOD CONTAINER

Ray L. Steven, Los Angeles, Calif.

Application August 4, 1942, Serial No. 453,519

3 Claims. (Cl. 126—263)

This invention relates to containers and more especially to containers for food articles, and adapted to have self-generating heat characteristics.

An object of the invention is to provide a simple, practical and inexpensive container of the character described.

Another object of the invention is to provide a food container such as a lunch box having a chemical compartment adapted for providing heat upon a mixture with water.

A further object of the invention is to provide a heated food container of the character described adapted to contain both liquid and solid foods.

An additional object is to provide in a container of the character described, novel means for disposing of the heat vapors while retaining the exterior of the container in a cool state.

Other objects and advantages will appear and be brought out in the following specification, reference being had to the accompanying drawing wherein:

Fig. 1 is a perspective view of an embodiment of my invention showing one of the elements in detached relation.

Fig. 2 is a sectional elevational view taken along the line 2—2 of Fig. 1.

Fig. 3 is a sectional elevation taken along the line 3—3 of Fig. 2.

Fig. 4 is a separate view in perspective showing the chemical compartment of the container, and Fig. 5 is a perspective view of one of the spacer elements.

Referring more particularly to the drawing I show a container 6 generally rectangular in form and preferably constituted of cardboard, paperboard, or the like, having side walls 7, end walls 8 and 9, and bottom 10. An inner wall structure 11 is formed of similar materials and spaced from walls 7, 8 and 9, and bottom 10 by a plurality of U-shaped spacers 12, there being wall portions 13 suitably secured to the inner or outer walls, and having top flange portions 14 which cover the air chamber 15 between the inner and outer walls. This air chamber provides a heat insulating space as will be more apparent hereinafter.

In Fig. 4 I show separately a container structure 16 of thin walled or imperforate material containing a quantity of a suitable comminuted dry chemical 17 such as lime, which upon being mixed with water, effervesces and generates heat. Container 16 is of smaller dimensions than the inner wall structure 11, and is spaced therefrom and supported by a plurality of rectangular-shaped pieces 18. A pair of tubes 19 are shown, each tube extending through apertures in container 16 and wall structure 11, and being aligned with apertures 20 in side walls 7. Apertures 20 may each be provided as desired with a thin frangible cover which will be broken upon a slight internal pressure from the chemical chamber.

Between the ends of containers 16 and wall structure 11 spaces are provided for packages 21 which may be articles of solid food such as sandwiches, meat, vegetables or the like, and above container 16 and partially supported thereby and forming a cover is a receptacle 22 which may be a flask for a liquid such as coffee, tea, milk or otherwise. Flask 22 has a neck 23 which is adapted to extend through apertures 24 and 25 in end wall 8 and inner wall structure 11 respectively.

As should be clear from the foregoing description, my improved container is readily portable and may contain both solid and liquid food. When food is to be heated a little water is poured into one of tubes 19, which upon mixing with the chemical 17, effervesces and generates heat. In the mixing process vapors are given off and tubes 19 provide escape passages for the same. The space surrounding container 16 becomes a heat chamber and heats packages 21 and receptacle 22, spaces 15 preventing the rapid escape of the heat as well as maintaining the exterior of container 6 cool, so that it may be handled. Flask 22 may be removed in order to dispense the beverage contained therein, as will be obvious.

Having described my invention what I claim is:

1. An article of the character described comprising a double walled container, a chemical container within said first container and disposed in spaced relation to the wall portions thereof, the wall of said first container having an opening, an expansion and fluid inlet passage in communication with said inner container and extending through said opening, and a plurality of food receptacles within said first container in proximity to said second container.

2. An article of the character described comprising a container having a pair of spaced outer walls and an open wall portion, a second container within and spaced from said container, and containing a chemical which is exothermic when water is added thereto, a plurality of fluid and inlet passages in communication with said second container, and extending through the walls of said first container, a food container adapted to be positioned in said open wall portion, and a plurality of food compartments positioned within said first container and between the wall portions thereof and said second container.

3. An article of the character described comprising an insulated walled container having a top wall opening, a chemical container disposed within said first container, there being an expansion chamber externally of said second container, a food container adapted to be positioned in said top wall opening and form a closure therefor, and a fluid inlet and expansion passage extending through a wall portion of said first container and being in communication with the interior of said second container.

RAY L. STEVEN.